US012783587B2

(12) United States Patent
Bates

(10) Patent No.: US 12,783,587 B2
(45) Date of Patent: Nov. 3, 2026

(54) DATA ANALYSIS THROUGH CLUSTER KINEMATICS

(71) Applicant: Zaggy AI LLC, Alpharetta, GA (US)

(72) Inventor: Robert Bates, Atlanta, GA (US)

(73) Assignee: Zaggy AI LLC, Alpharetta, GA (US)

( * ) Notice: Subject to any disclaimer, the term of this patent is extended or adjusted under 35 U.S.C. 154(b) by 0 days.

(21) Appl. No.: 19/091,452

(22) Filed: Mar. 26, 2025

(65) Prior Publication Data

US 2025/0315485 A1 Oct. 9, 2025

Related U.S. Application Data

(60) Provisional application No. 63/575,015, filed on Apr. 5, 2024.

(51) Int. Cl.
*G06F 16/906* (2019.01)

(52) U.S. Cl.
CPC .................................. *G06F 16/906* (2019.01)

(58) Field of Classification Search
CPC .................................................... G06F 16/906
See application file for complete search history.

(56) References Cited

U.S. PATENT DOCUMENTS 9,336,484 B1* 5/2016 Iverson ............... G06F 18/2433
2015/0325000 A1* 11/2015 Sripada ................. G06V 20/41 382/103
2016/0328654 A1* 11/2016 Bauer ..................... G06F 18/24
2018/0322394 A1 11/2018 Nguyen et al.
2019/0180527 A1* 6/2019 Segal ..................... G06N 20/00
2020/0409339 A1* 12/2020 Arashanipalai ....... G06F 16/906
2021/0285982 A1 9/2021 Soejima
2021/0397175 A1* 12/2021 Tsutsumi ............. G05B 23/024

OTHER PUBLICATIONS

Bates, Robert; International Search Report and Written Opinion for PCT Application No. PCT/US2025/022033, filed Mar. 28, 2025, mailed Jun. 12, 2025, 12 pgs.

* cited by examiner

*Primary Examiner* — Khanh B Pham
(74) *Attorney, Agent, or Firm* — Smith, Gambrell & Russell LLP

(57) ABSTRACT

Methods, systems, and computer-readable storage media for using cluster kinematics for enhanced data analysis of temporal data. A data sample from a temporal sequence of data samples associated with a node is received and projected into a projection space of a clustering model defining one or more clusters. A distance value associated with each of the one or more clusters in the clustering model is calculated for the data sample. One or kinematic metrics associated with a cluster in the clustering model are calculated for the node from the calculated distance values, a time value associated with the received data sample, and previously calculated distance values and kinematic metrics for the node calculated from previously received data samples, where the calculated kinematic metrics represent a trajectory of the node in relation to the cluster in the projection space of the clustering model.

20 Claims, 12 Drawing Sheets

DATA ANALYSIS THROUGH CLUSTER KINEMATICS

CROSS-REFERENCE TO RELATED APPLICATIONS

This application claims the benefit of U.S. Provisional Application No. 63/575,015 filed on Apr. 5, 2024, and entitled "DATA ANALYSIS THROUGH CLUSTER KINEMATICS," the entire disclosure of which is hereby incorporated herein by this reference.

BACKGROUND

Cluster analysis or "clustering" is the task of grouping a set of objects in such a way that objects in a same group (referred to as a "cluster") are more similar to each other in some specific sense, as defined by the analyst, than to those in separate groups (clusters). Grouping objects into a number of groups by similarity can be a primary goal of exploratory data analysis, and clustering is a common technique for such analysis. Clustering is used in many fields, including pattern recognition, image analysis, information retrieval, bioinformatics, data compression, computer graphics, machine learning, and the like.

Some uses of clustering within the machine learning space focus mostly on unsupervised learning and self/semi-supervised learning solutions where labeled data is scarce or nonexistent and analysts are attempting to identify latent patterns within the sample data. A first step in cluster analysis typically involves sanitizing and normalizing input data and identifying features that appear to provide the most useful information (referred to as "feature engineering"). Next, unless the sample data is low-dimensional, some dimensionality reduction techniques may be applied, projecting the data into a smaller-dimensional space more amenable to known cluster algorithms. These projections may also leverage statistical analysis in an attempt to capture differentiating features (e.g., Principal Component Analysis or "PCA") or structural features (e.g., graph projections into Hilbert spaces).

Good feature engineering and projection selection will result in vectors that can be meaningfully compared for similarity, often leveraging some scalar distance metric (e.g., Euclidean distance), or similarity score (e.g., cosine similarity or KL-divergence). Once feature engineering, dimensionality reduction, and similarity algorithms have been selected, a clustering model can be constructed to group training samples into groups based on latent patterns in the training data. The result is a collection of clusters identified by the algorithm (often some variant of K-means) including cluster centers and, possibly, a radius or tolerance for inclusion in each cluster defined for future classification processing.

Typically, to leverage the clustering model, a new, unseen sample is projected into the cluster feature space and similarity metrics are calculated for each cluster center. Based on these similarity metrics and any radius/tolerance settings for the clusters, the sample may be assigned to the cluster with the smallest similarity difference. Subsequent samples are processed in a similar fashion, with each sample presented to the clustering model in isolation. In the event that the new samples begin to "drift" further from the existing cluster centers, the clustering model can be recalculated in order to take into account newer samples from more contemporary data sources.

However, conventional clustering approaches do not account for temporal changes in samples associated with a same object presented to the clustering model. This means that if a sample representing, e.g., the state of a particular system is captured at time to and clustered, and another sample of the system state is captured at time $t_1$, the two samples are classified in isolation, as are any subsequent samples captured through time $t_n$, and any "movement" of the associated system state in the clustering model's projection space cannot be identified.

BRIEF SUMMARY

The present disclosure relates to technologies for using cluster kinematics for enhanced data analysis of temporal data. According to some embodiments, one method for computing kinematic metrics for a node includes receiving a temporal sequence of data samples associated with the node, wherein each data sample in the temporal sequence comprising a vector of N dimensions and the temporal sequence of data samples comprises at least a first data sample corresponding to a first time and a second data sample corresponding to a second time. The first data sample is projected into a projection space of a clustering model, the clustering model defining one or more clusters in the N dimensions and trained on data samples comprising vectors of the same N dimensions. A distance value associated with each of the one or more clusters in the clustering model is calculated for the first data sample. The second data sample is projected into the projection space of the clustering model and a distance value associated with each of the one or more clusters in the clustering model is calculated for the second data sample. Computing of the kinematic metrics for the node comprises at least calculating a first velocity associated with at least one cluster of the one or more clusters in the clustering model from the distance values associated with the at least one cluster calculated for the first data sample and the second data sample and a difference between the first time and the second time.

According to further embodiments, a computer-readable medium is encoded with computer-executable instructions that, when executed by a processor of a cluster kinematics analysis system, cause the cluster kinematics analysis system to receive a first data sample of a temporal sequence of data samples associated with a node, the first data sample corresponding to a first time. The first data sample is projected into a projection space of a clustering model defining one or more clusters. The cluster kinematics analysis system then calculates a distance value associated with each of the one or more clusters for the first data sample. A second data sample corresponding to a second time is received and projected into the projection space, and a distance value associated with each of the one or more clusters is calculated for the second data sample. The cluster kinematics analysis system calculates a first velocity associated with at least one cluster of the one or more clusters for the node from the distance values associated with the at least one cluster calculated for the first data sample and the second data sample and a difference between the first time and the second time. A third data sample corresponding to a third time is received and projected into the projection space, and distance values associated with each of the one or more clusters is calculated for the third data sample. The cluster kinematics analysis system calculate a second velocity associated with the at least one cluster for the node from the distance values associated with the at least one cluster calculated for the second data sample and the third data sample and a difference between the second time and the third time, and then calculates an acceleration associated with the at least one cluster for the node from the first velocity and the second velocity calculated for the node and the difference between the second time and the third time.

According to further embodiments, a cluster kinematics analysis system comprises a datastore and a processor. The datastore contains a clustering model defining one or more clusters in an N-dimensional projection space. The processor is operably connected to the datastore and configured to, upon receiving a data sample from a temporal sequence of data samples associated with a node, wherein each data sample associated with a time value, apply feature encoding to the data sample to encode the sample into a vector of N dimensions and project the data sample into the projection space. The processor calculates a distance value associated with each of the one or more clusters in the clustering model for the data sample and stores the calculated distance values in the datastore associated with the node and the associated time value. One or kinematic metrics associated with at least one cluster of the one or more clusters in the clustering model are then calculated for the node from the calculated distance values, the associated time value, and previously calculated distance values and kinematic metrics for the node retrieved from the datastore, the one or more kinematic metrics representing a trajectory of the node in relation to the at least one cluster in the projection space of the clustering model.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale, and any measurements provided are shown to provide a relative size context and are not intended to be limiting. Like numerals represent like elements throughout the several figures.

DETAILED DESCRIPTION

Figure 1A:
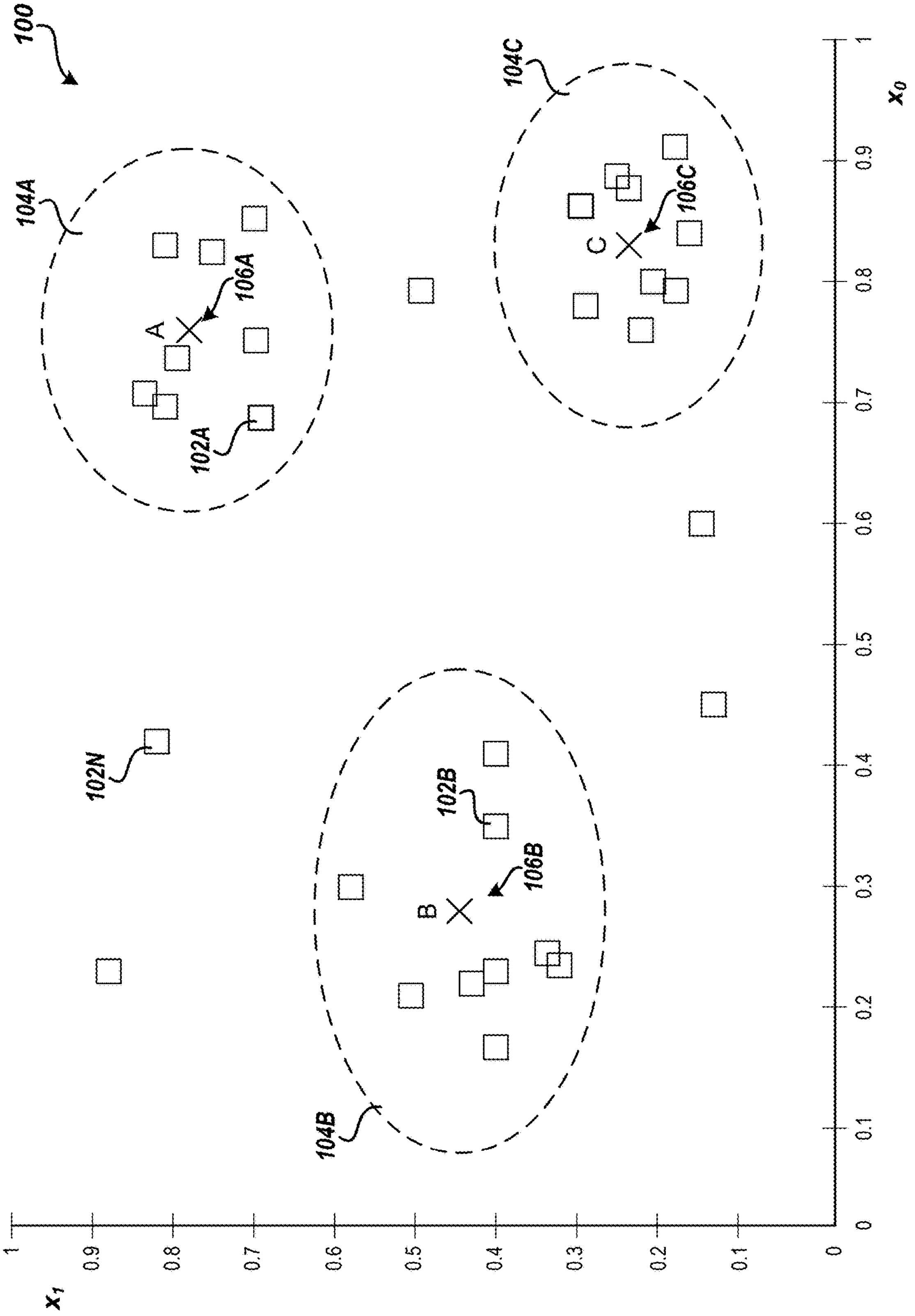
FIGS. 1A-1E depict an illustrative projection space of a clustering model and kinematic analysis of temporal sequences of samples, according to embodiments presented herein.

The present disclosure relates to technologies for using cluster kinematics for enhanced data analysis of temporal data. Utilizing the technologies presented herein, a cluster analysis technique may be implemented that applies kinematics calculations for velocity and acceleration to estimate which cluster(s) a temporal sequence of two or more samples are converging on and/or diverging from at any time t before they are actually assigned to a cluster in the conventional clustering model. For example, from a calculation of distance metrics $d_0$ and $d_1$, e.g., Euclidian distances from a center of a cluster, for one sample taken at $t_0$ and another sample taken at $t_1$, respectively, a “velocity” of the sequence of the samples with respect to the cluster center in the clustering model's projection space can be calculated:

$$v_{01} = \frac{(d_1 - d_0)}{(t_1 - t_0)}$$

From the calculation of relative per-cluster velocities, a determination of whether the sequence of samples is converging on and/or diverging away from any given cluster may be made.

Further, from one additional distance metric $d_2$ calculated for a sample taken at time $t_2$, the velocity $v_{12}$ can be similarly calculated. From the respective velocities $v_{01}$ and $v_{12}$, an acceleration $a_{12}$ of the sequence of samples with regard to the cluster center can also be calculated representing how quickly the sequence of samples is converging on or diverging away from any cluster in the model. Adding more temporal data points can provide more accurate velocity, acceleration, and/or trajectory estimation.

Using the cluster kinematics approach described herein on a temporal sequence of samples coupled with clustering models may provide a more accurate and earlier prediction of future cluster assignment due to the analysis of how the sequence of samples are “moving” within the clustering model's projection space. This approach should be agnostic to the clustering algorithm used and the similarity metric selected, as long as the clustering algorithm includes a definition of each cluster's center and the similarity metric can be reduced to a scalar for velocity calculations.

FIGS. 1A-1E provide further details of data analysis through cluster kinematics, according to some embodiments. Specifically, FIGS. 1A-1E depict an illustrative projection space 100 of a clustering model and spatiotemporal trajectories of sequences of samples in the space over time. As shown in more detail in FIG. 1A, the projection space 100 may comprise of two dimensions $x_0$ and $x_1$ representing two distinct features identified in input data. Two dimensions were selected for this example for ease of illustration and this selection is not intended to be limiting. Individual data samples, such as samples 102A-102D (referred to herein generally as samples 102), representing training data are projected into the two-dimensional projection space 100 based on their respective values of the identified features. According to embodiments, utilizing a selected similarity metric and clustering algorithm, a clustering model can be constructed to group the samples 102 of the training data into clusters, such as clusters 104A-104C, reflecting latent patterns in the data. The clusters 104A-104C may be defined by their centers 106A-106C, respectively, and/or boundaries comprising radii, tolerance(s), etc. As will be appreciated by one skilled in the art, some samples in the training data will fall within (also referred to as “assigned to” or “categorized as”) the defined clusters, such as sample 102A in cluster A

104A or sample 102B in cluster B 104B, while other samples may fall outside the bounds of a defined cluster, such as sample 102N.

Figure 1B:
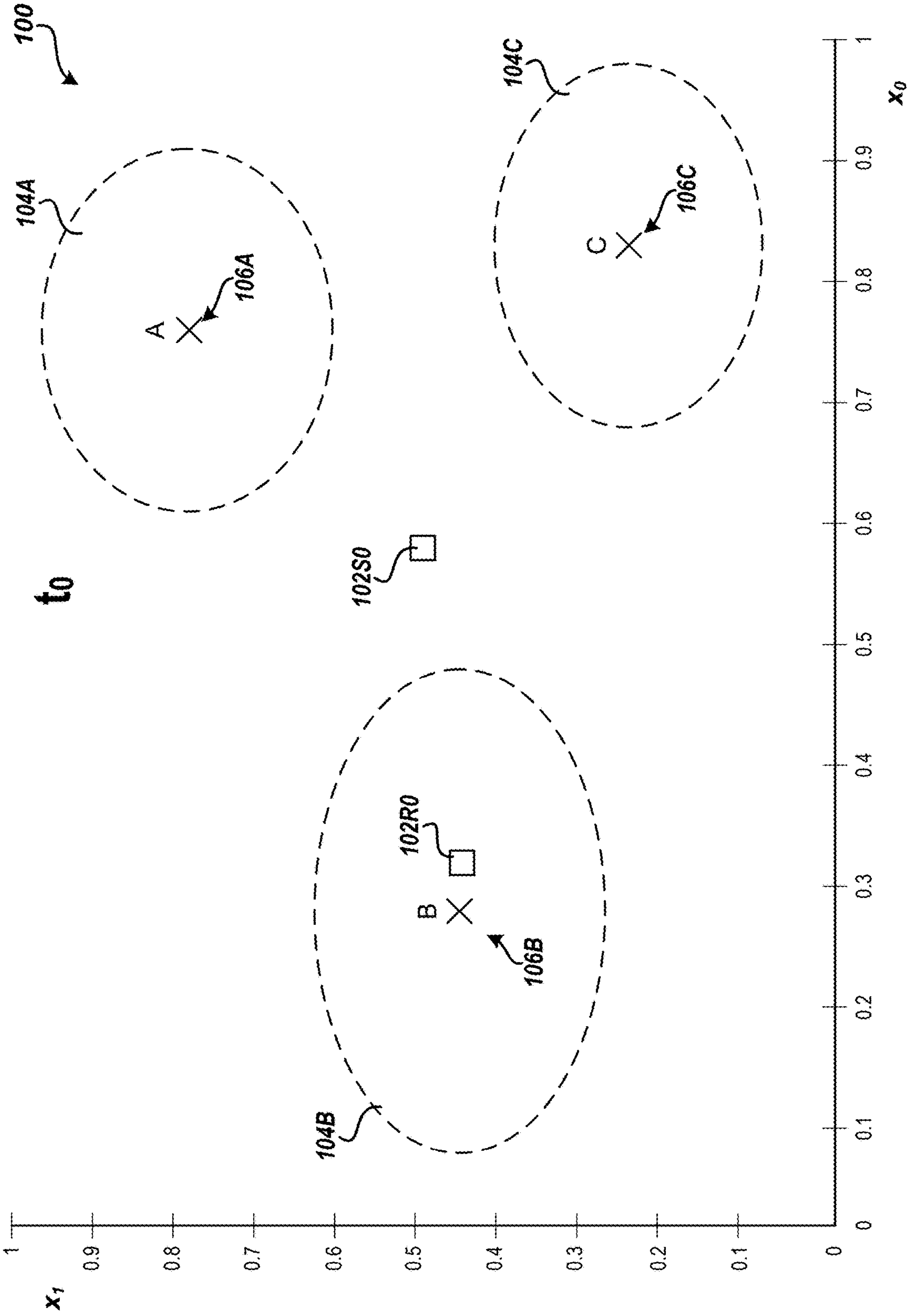

As shown in FIG. 1B, once the clustering model is defined and trained, one or more new samples, such as samples 102R0 and 102S0, may be projected into the projection space 100. The new samples 102R0 and 102S0 may each represent a first sample from a sequence of samples associated with specific objects R and S, respectively, for classification within the clustering model. For demonstration, the time of reception of samples 102R0 and 102S0 shown in FIG. 1B is labeled as $t_0$. According to embodiments, the samples 102R0 and 102S0 received at time $t_0$ may be classified within the clustering model in a conventional fashion, with sample 102R0 assigned to cluster B 104B and sample 102S0 not assigned to a cluster.

Figure 1C:
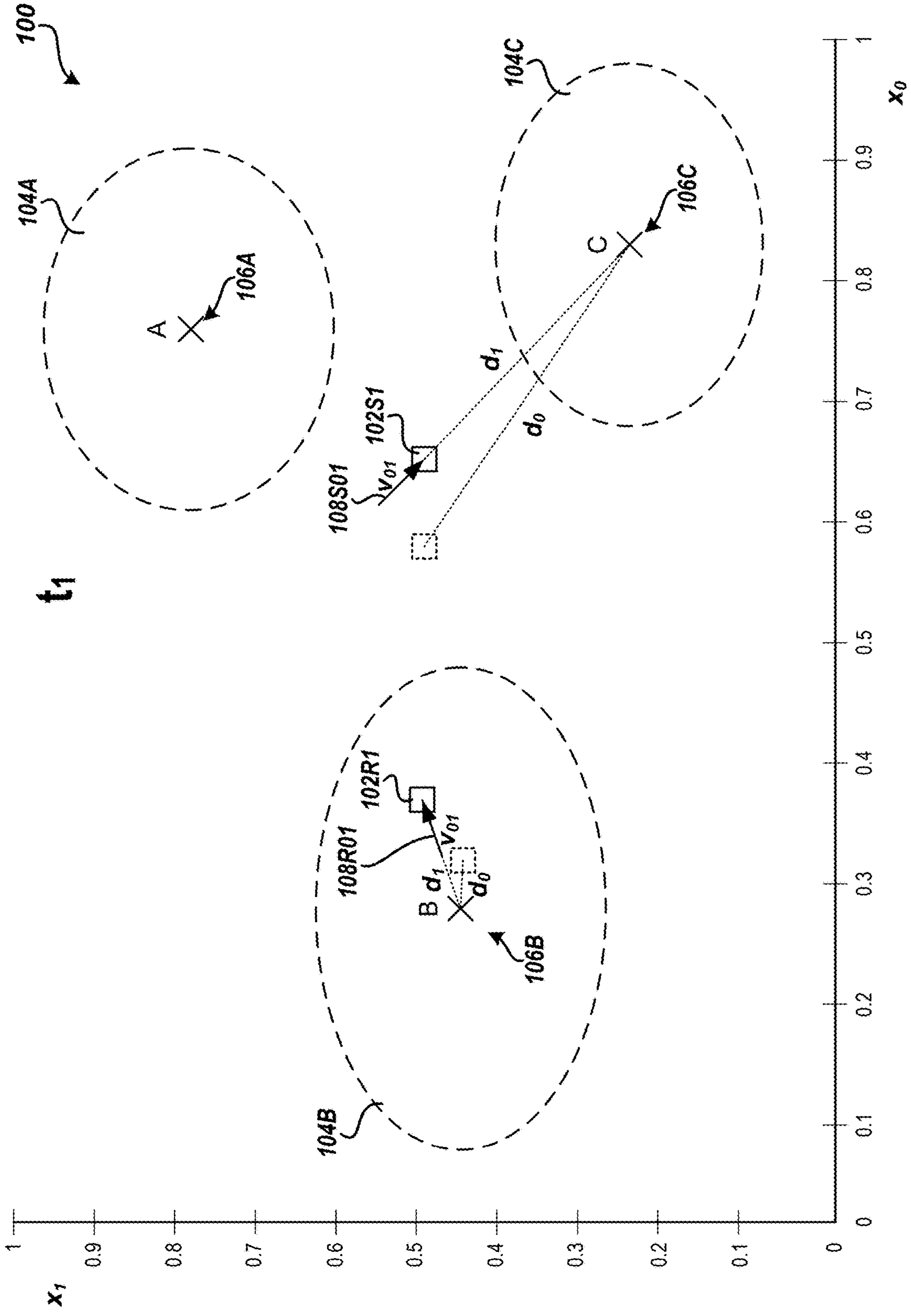

FIG. 1C shows new samples 102R1 and 102S1 associated with objects R and S, respectively, received at time $t_1$ and projected into the projection space 100. As may be seen in the figure, the samples 102R1 and 102S1 are still assigned to cluster B 104B and no cluster, respectively, according to application of the conventional clustering model. Additionally, cluster kinematic calculations may be performed utilizing the new samples 102R1 and 102S1 received at time $t_1$ and the previous samples 102R0 and 102S0 received at time $t_0$. For example, a velocity $v_{01}$, shown in FIG. 1C as vector 108R01, of "movement" in the samples associated with object R with respect to cluster B 104B may be calculated from the difference between the distances $d_1$ and $d_0$ from the cluster center 106B of samples 102R1 and 102R0, respectively, divided by the time difference between $t_1$ and $t_0$, i.e.:

$$v_{01} = \frac{(d_1 - d_0)}{(t_1 - t_0)}$$

Similarly, the velocity $v_{01}$ 108S01 of samples associated with object S with respect to cluster C 104C may be calculated from the difference between the distances $d_1$ and $d_0$ from the cluster center 106C of samples 102S1 and 102S0, respectively, divided by the time difference between $t_1$ and $t_0$ . As depicted in FIG. 1C, while conventional application of the clustering model still assign the sample 102R1 associated with object R to cluster B 104B and the sample 102R1 associated with object S to no cluster, the cluster kinematic calculations reveal a divergence of samples associated with object R from cluster B 104B and a convergence of samples associated with object S on cluster C 104C.

Figure 1D:
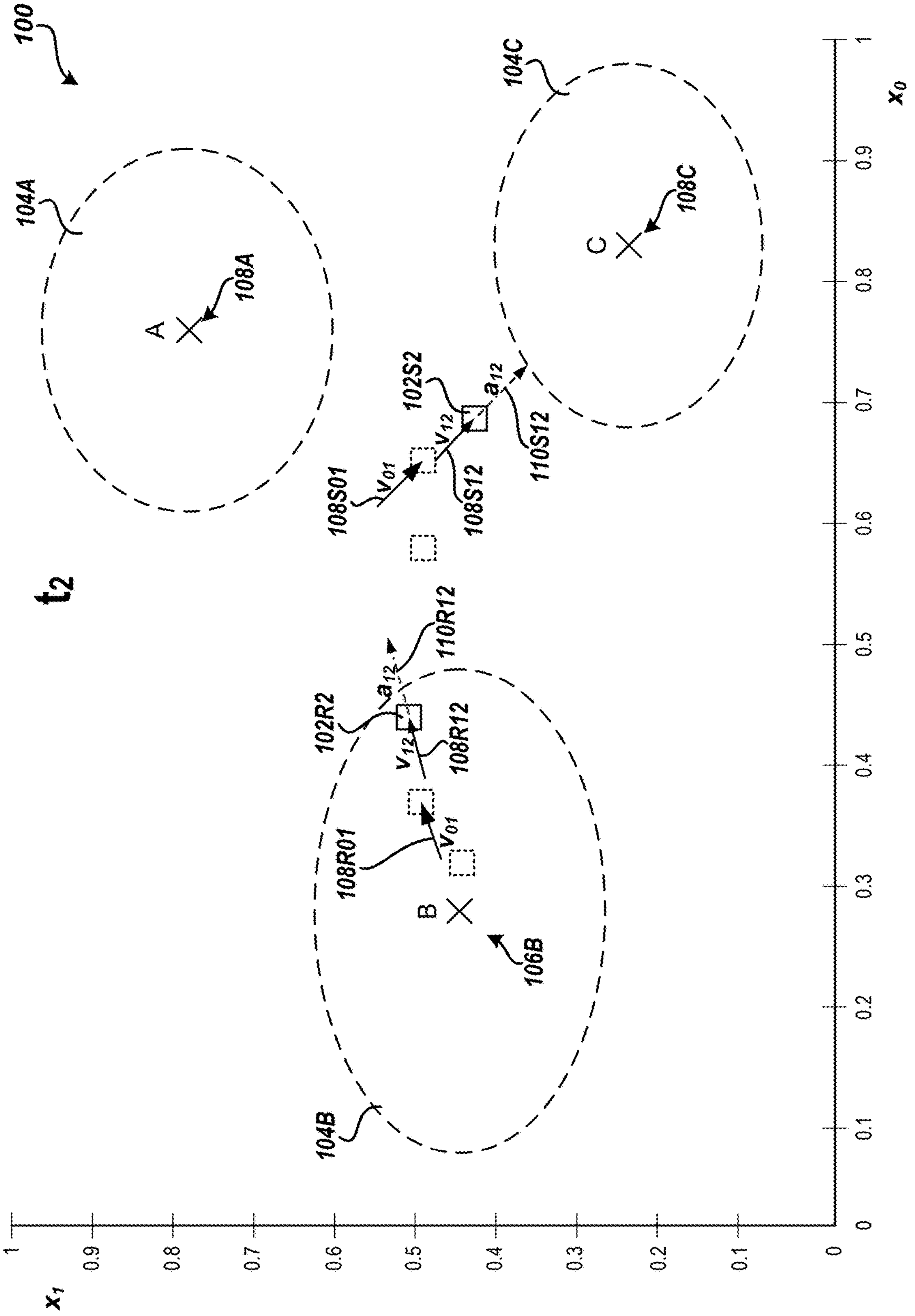

Further, using new samples 102R2 and 102S2 received at time $t_2$, as shown in FIG. 1D, an additional velocity $v_{12}$ 108R12 associated with object R with respect to cluster B 104B and velocity $v_{12}$ 108S12 associated with object S with respect to cluster C 104C may be similarly calculated from the respective differences in distances and time. Additionally, from the two calculated velocities $v_{12}$ 108R12 and $v_{01}$ 108R01 associated with object R, an acceleration $a_{12}$, shown in FIG. 1D as vector 110R12, in the divergence of the samples associated with object R from the cluster B 104B may be calculated, i.e.:

$$a_{12} = \frac{(v_{12} - v_{01})}{(t_2 - t_1)}$$

Similarly, the acceleration $a_{12}$ 110S12 of samples associated with object S with respect to the convergence on cluster C 104C may be calculated from the two calculated velocities $v_{12}$ 108S12 and $v_{01}$ 108S01 associated with object S. The accelerations $a_{12}$ 110R12 and 110S12 may provide an indication of an increase or decrease of the speed of convergence/divergence of the samples associated with objects R and S, respectively, from the clusters B and C.

Figure 1E:
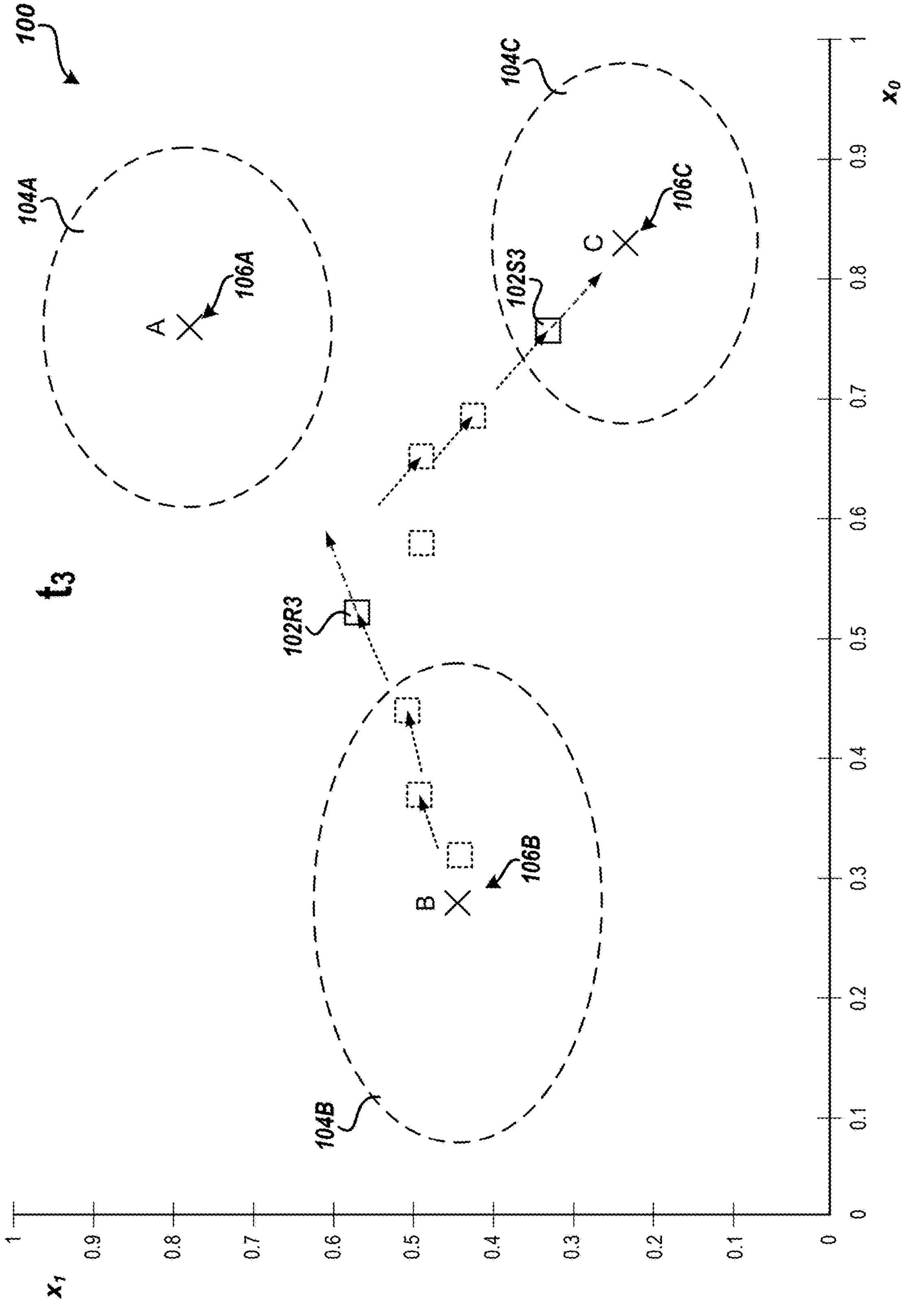

It will be appreciated by one skilled in the art upon reading this disclosure that the accelerations $a_{12}$ along with the velocities $v_{01}$ and $v_{12}$ calculated from samples 102R0-102S2 over time may provide additional information for the categorization of objects R and S beyond the conventional application of the clustering model to each sample in isolation, and may provide the ability to predict future cluster assignments of (samples associated with) objects before the assignment by the conventional clustering model (see, e.g., FIG. 1E). It will be further appreciated that, while FIGS. 1A-1E illustrate computation of velocities and/or accelerations (referred to herein collectively as "trajectories") of samples 102R0-102R3 associated with object R with respect to cluster B 104B and samples 102S0-102S3 associated with object S with respect to cluster C 104C, the cluster kinematic calculations described herein may be used to compute trajectories for samples associated with each object respective to each cluster defined by the model, with the respective trajectories of each cluster utilized in conjunction with the conventional application of the clustering model for the categorization of objects R and S.

Figure 2:
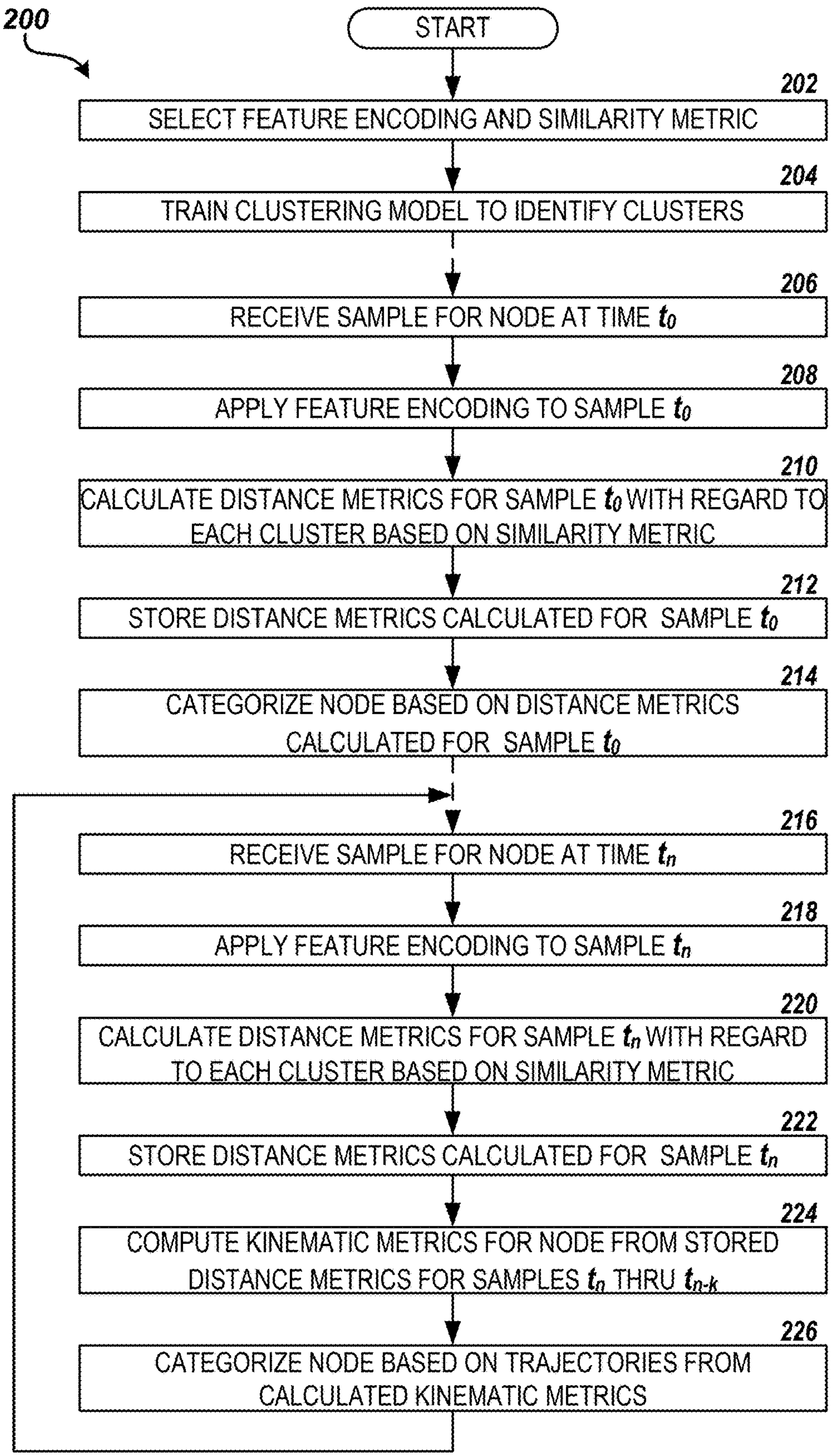
FIG. 2 is a flow chart showing an exemplary routine facilitating data analysis of a temporal sequence of data samples utilizing cluster kinematics, according to embodiments presented herein.

FIG. 2 illustrates one routine 200 for performing data analysis of a temporal sequence of data samples utilizing cluster kinematics, according to embodiments described herein. In some embodiments, the temporal sequence of data samples may represent samples 102 associated with a specific object, also referred to as a "node," taken over time. As an example, each sample 102 may represent sample data derived from multivariate time series data from sensors monitoring an air production unit ("APU") installed on the roof of a vehicle in an urban metro public transportation service, the data comprising sensor data, such as pressure, temperature, current consumption, etc.; digital signal data, such as control signals, discrete signals, etc.; GPS information of the associated vehicle, such as latitude, longitude, speed, etc.; and the like. The cluster kinematics analysis routine 200 may be performed for the purpose of near real-time anomaly detection and failure prediction.

Figure 3:
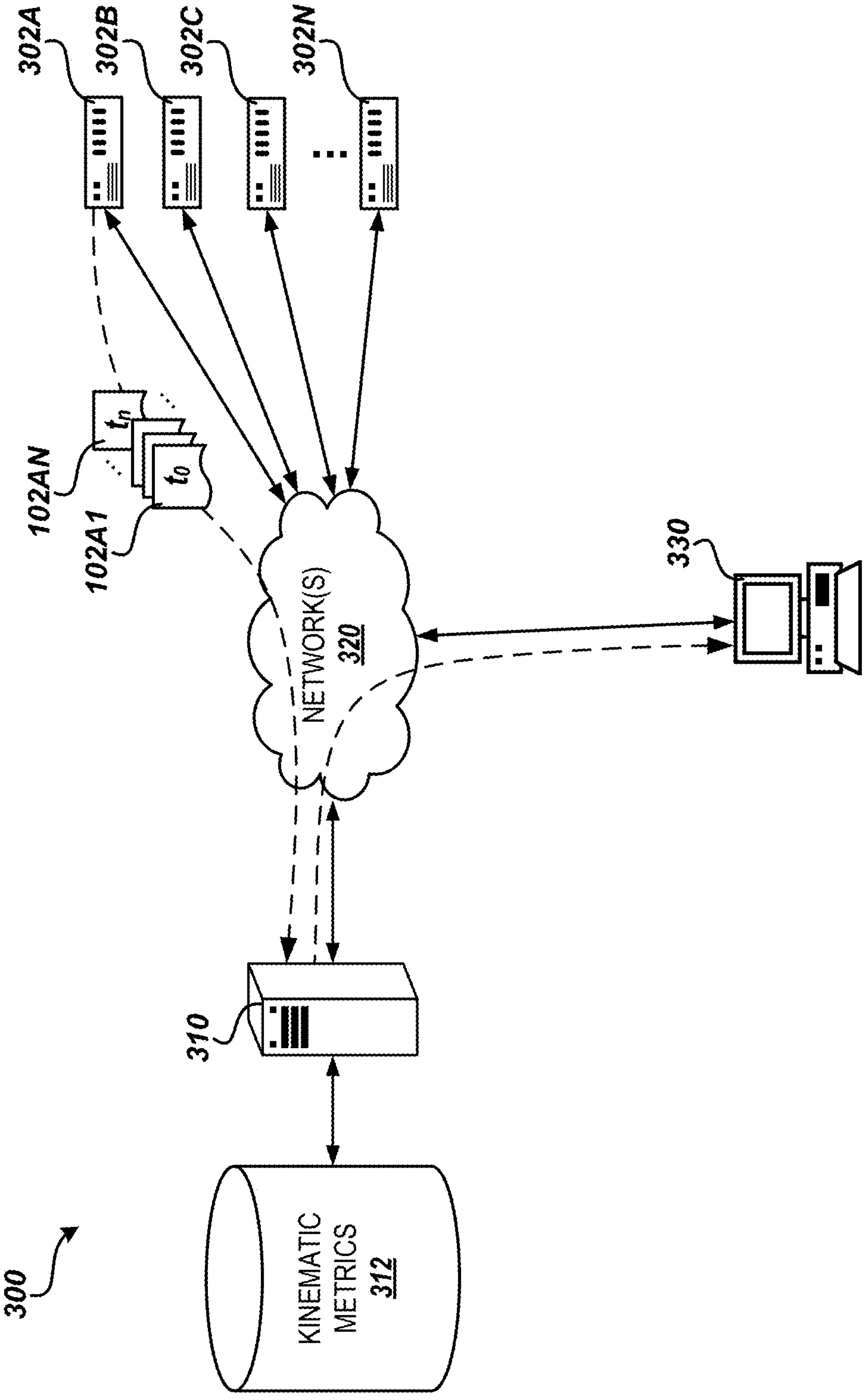
FIG. 3 is a system diagram showing the components of a cluster kinematics analysis system utilizing cluster kinematics, according to embodiments presented herein.

According to some embodiments, the steps of the routine 200 may be performed by software and hardware in a cluster kinematics analysis system, such as the cluster kinematics analysis system 300 shown in FIG. 3. The cluster kinematics analysis system 300 may comprise a cluster kinematics analysis server 310 that collects a temporal sequence of data samples 102 from a number of nodes 302A-302N over one or more networks 320. For example, samples 102A1-102AN may represent samples collected from a particular node 302A over a number n time periods, labeled $t_0$ through $t_n$. The nodes 302A-302N may represent specific objects, such as the APUs in the instant example. The network(s) 320 may comprise any combination of networking infrastructure that allows transmission of the data samples 102 from the nodes 302A-302N to the cluster kinematics analysis server 310 in the cluster kinematics analysis system 300, such as 5G or LTE cellular data networks, MANs, WANs, LANs, and/or the Internet. The cluster kinematics analysis server 310 may represent virtualized AI and/or conventional server computing resources available in SaaS offerings such as AWS, GCP, Microsoft Azure, and the like.

The cluster kinematics analysis system 300 may further comprise a datastore 312 operably connected to the cluster kinematics analysis server 310 and utilized to store sample data used for training, clustering models, derived samples 102, cluster assignments, calculated kinematic metrics, and other data necessary for the server resources to perform the routine 200 as described herein. The datastore 312 may represent working memory, a conventional database, a vector database, virtualized data storage resources, or any combination of these and other data storage mechanisms known in the art. Results of the data analysis performed by the cluster kinematics analysis server 310 may be made available to users of remote computing devices 330 over the network(s) 320, as described in the embodiments presented herein. In other embodiments, the routine 200 may be performed by some combination of server resources, remote computing devices, and/or other computing devices, components, and modules of the cluster kinematics analysis system 300.

The routine 200 begins at step 202, where a feature encoding scheme and similarity metric are selected for building a clustering model for the data samples 102 to be processed by the cluster kinematics analysis system 300. In the instant example, the most representative features for detection of anomalies and predicting failure may be selected from the data in the samples 102 received from the APUs using one or more of correlation analysis, principal component analysis ("PCA"), domain knowledge heuristics, and the like. For example, the vehicle GPS data may be stripped out of the samples if it is determined to not be relevant to failures in the APUs.

Once the dataset has been pared down to the desired features, a method for feature encoding the remaining feature data can be selected that is able to reduce the data to fewer dimensions and still capture latent patterns, making the encoding suitable for clustering algorithms. A desired sequence length/timeframe may also be selected for the multivariate time series sequence data to be used for each dataset sample (e.g., utilizing sliding/rolling windows). In addition, a scalar similarity metric is selected that provides the criteria for determining if a sample belongs to a cluster or not. A common similarity metric is Euclidean distance calculated from a sample vector of rank one.

From step 202, the routine 200 proceeds to step 204, where a clustering model is trained from a set of training data comprising representative samples 102, with the resulting cluster model comprising a set of cluster centers identified from latent patterns in the cluster space, each cluster potentially representing an operating state of an APU (e.g. nominal, different failure modes, etc.). These cluster centers are used by the cluster kinematics analysis system 300 for future sample classification by calculating the distance between each cluster center and the sample 102, with the closest cluster (or a cluster center within a certain radius/tolerance) being assigned to the sample. Any number of clustering algorithms known the art may be applied for training the clustering model, such as K-Means clustering, which is optimized for Euclidean distance metrics.

The routine 200 proceeds from step 204 to 206, where a sample, e.g., sample 102A0, is received by the cluster kinematics analysis server 310 associated with a specific node, such as node 302A, taken at a time designated $t_0$. For example, the sample 102A0 at $t_0$ may represent a window of the previously selected length/timeframe applied to sensor data from an APU represented by node 302A. At step 208, the selected feature encoding method is applied to the sample 102A0, and a distance metric is calculated for the sample for each cluster in the clustering model based on the selected similarity metric, as shown at step 210. For example, a Euclidian distance of the sample 102A0 from the center 106 of each cluster 104 defined in the projection space 100 may be calculated. At step 212, the distance metric calculated for each cluster may be stored for the sample 102A0 in the datastore 312. Additionally, the node 302A may be categorized by the conventional assignment of a cluster from the clustering model from the distance metrics and/or any defined cluster radii/tolerances. For example, an expected operating state at time $t_0$ of the associated APU may be determined.

The routine 200 proceeds to step 216, where a new sample, e.g., sample 102AN, is received by the cluster kinematics analysis server 310 associated with the node 302A (APU) at a time designated $t_n$. As in steps 208 and 210, the selected feature encoding method is applied to the sample 102AN at step 218 and a distance metric is calculated for each cluster in the clustering model based on the selected similarity metric, as shown at step 220. At step 222, the distance metrics corresponding to each cluster are stored for the sample 102AN in the datastore 312.

From step 222, the routine 200 proceeds to step 224, where kinematic metrics are computed for the sample 102AN for time tn. According to some embodiments, the kinematic metrics include one or more trajectories (velocity and/or acceleration) in relation to each cluster defined by the clustering model. For example, as discussed above in regard to FIG. 1C, a velocity of the sample 102AN in relation to a first cluster B 104B of the clustering model may be calculated by dividing the difference in distance metrics related to cluster B calculated for the sample taken at $t_n$ and the sample taken at $t_{n-1}$ by the time difference between $t_n$ and $t_{n-1}$. Similarly, as discussed above in regard to FIGS. 1D, an acceleration of the sample 102AN in relation to cluster B 104B may be calculated by dividing the difference in the velocities related to cluster B calculated for the sample taken at $t_n$ and the sample taken at $t_{n-1}$ by the time difference $(t_n-t_{n-1})$. According to further embodiments, the kinematic metrics calculated for the sample 102AN are further stored in the datastore 312.

The routine 200 proceeds from step 224 to step 226, where the cluster kinematics analysis server 310 utilizes the kinematic metrics calculated from the samples 102 related to the node 302A to further classify and/or predict future cluster assignments within the clustering model for the node. For example, the velocities calculated at time $t_n$ may provide an indication of whether the sample 102AN is converging, diverging, or is "stationary" in relation to each cluster, which may provide insight into the evolving state of the associated node 302A, e.g., the operating state of the APU (moving away from nominal, moving towards a particular failure mode, etc.). Similarly, the accelerations calculated at time $t_n$ may provide an indication of how fast the state of the associated node 302A (APU) is evolving, e.g., allowing for the estimation of a time-of-arrival of the node (APU) into a failure mode. From step 226, the routine 200 returns to step 216, where the cluster kinematics analysis server 310 continues to receive samples 102 associated with the node 302A (APU) to further refine the velocity, acceleration, and other trajectory estimations, allowing for, e.g., earlier failure mode predictions for an APU, improved estimation of remaining useful life (RUL) of an APU, optimized maintenance scheduling of APUs for the metro service, and the like.

Additional Use Cases

Predictive Maintenance of Different Systems

According to some embodiments, with an initial set of system state samples, a cluster model can be trained to identify individual clusters defining the "normal" state or behavior of each system. The cluster kinematic analysis routines described herein could be applied to new system state samples to provide real-time monitoring of the states of the systems. As time progresses, if a particular system is running nominally, then the system state at each time step $t_n$ should ideally fall within the cluster for that system, resulting in small or no average velocity/acceleration from one sample $t_n$ to the next $t_{n+1}$. However, if samples begin to "move" in the cluster space with increasing velocity and/or acceleration, then the associated system may be classified as diverging from the "nominal" system state cluster to somewhere else in the cluster space.

Further, if the cluster model has been further trained with data from failing/failed systems, then the cluster kinematics analysis could further provide indications of the movement of the system state towards a particular failure mode, or possibly towards another nominal state cluster (e.g., same type of machine, newer or older motor). The use of cluster kinematics to predict evolving system states differs from many conventional predicative maintenance systems, which often utilize basic threshold approaches or something based on Gaussian Mixture Models ("GMM"), where statistical analysis determines if average, standard deviation, and variance would signify a difference from a single sample compared to the overall cluster model.

In a specific example, various subsystems of a racecar may be monitored, e.g.:

- Powertrain (engine, transmission)
- Chassis (suspension, bodywork, tires)
- Electronics (lights, batteries, computers, sensors, hybrid drive systems)
- Aerodynamics (on downforce vehicles, think Le Mans, F1)

A racecar may have several hundreds of sensors monitoring these systems, and no human can practically analyze the amount of data produced by the ever-increasing number of sensors. Traditional heuristics such as thresholds and simple "binary" alert channels may also not be sufficient, as a single sensor will not always reveal that a system is operating suboptimally and often the thresholds are only learned from past failures via postmortem analysis. Further, anomaly and outlier detection using conventional AI models may not be robust enough to analyze collections of multivariate time series data without models pretrained on large amounts of both nominal and suboptimal data, which are often not available (especially the suboptimal data).

Using the technologies described herein, a kinematics analysis system 300 or other analysis system using the disclosed methods may examine trends in the time series data to predict failures before they occur. The analysis may begin by gathering "session data" from the vehicle operating on a track. The session data may be split into laps, and a "baseline" lap may be identified for nominal vehicle performance. The sensors related to each vehicle system are identified and grouped into system sets (e.g., all sensors on electrical components are grouped together, all ECU channels grouped together, etc.), and the system sets can be normalized using the "baseline" lap. In addition, the system sets may be split into predefined segments per lap for segment-specific context for evaluation since what might be normal in one segment, e.g., a high-G turn, might not be normal for a different segment, e.g., a straightaway, of a track. For racecars in particular, the trend across laps for a given segment may be analyzed since the car is under unique conditions for each segment and what might be normal for one segment might by abnormal for another. For example, oil pressures might normally drop in a high-G turn segment but the same behavior in a straight segment would not be normal. Unusual fluctuations across laps for a given segment, however, could signify something is not nominal, e.g. rapid changes in oil pressure in a given segment across laps. Other use cases might be projected across different data dimensions as deemed appropriate.

The kinematics analysis system 300 may then project the system set features per lap, per segment into an analysis feature space utilizing an application-specific embedding function/model. For example, the time series data for each variate may be projected (a.k.a. "embedded" or "encoded") by calculating descriptive statistics (e.g. min, max, mean, standard deviation, quartiles/percentiles) which yields a fixed-length vector for a given variate (e.g., charging system voltage). More complex approaches could leverage Transformer-based DL models like Inception Time, some form of Dynamic Time Warping ("DTW"), or Markov Transition Fields ("MTFs"), to capture the latent patterns in each variate time series. Subsequently collapsing the multiple variate projections into a single projection vector (e.g., max, min, KL divergence, etc.) provides a final rank-1 vector that can be used in the clustering operations.

For each system set, the kinematics analysis system 300 may calculate the distances between each lap/segment projection (along the lap dimension), as well as distance to any known failure mode clusters seeded into the system (known/prior failures, as well as hypothetical failures). Cluster distances within the projected feature space can vary widely based on the characteristics of the latent grouping signals in the feature space. Euclidean distance is probably the most common and performant, but experimentation is often required to identify the most appropriate distance metric to use. One skilled in the art will appreciate that conventional clustering techniques and nearest-neighbor searches stop here, yielding fairly static results looking only at the cluster assignment of a single sample in isolation, for example. However, according to the embodiments described herein, the kinematics analysis system 300 takes these calculated distances and calculates the velocity and acceleration time derivatives of these distances lap-over-lap per segment to determine if the system set under analysis is "moving away" from the baseline and, if so, how quickly is it diverging.

Additionally, if there are known failure mode centers in the feature space for the system set under analysis, the kinematics analysis system 300 can identify which failure mode the system is moving towards an estimate a "time-of-arrival," which in the case of equipment failure is the remaining useful life ("RUL"), a much-sought-after metric in predictive maintenance. For example, the kinematics analysis system 300 may take lap 1, segment 1 (i.e., "L1S1"), isolate the sensor channels related to the electrical system (units like voltage, current, watts, etc.), and project those into a rank-1 tensor utilizing descriptive statistics. The kinematics analysis system 300 may then calculate that sample's Euclidean distance from the known cluster centers. Subsequently taking L2S1 and performing the same functions, the kinematics analysis system 300 now has the ability to determine if the distances from the cluster centers have changed significantly, as well as relative to L1S1, and, with the added dimension of time, can now calculate the velocity of the change in sensor data. Further, similar processing of samples from L3S1 allows the kinematics analysis system 300 to not only calculate a new velocity but also acceleration of the change in sensor data to see if this is a trend, and if so which cluster the electrical system is trending towards (based on trajectory projection using distances, velocity, and acceleration).

Figure 6A:
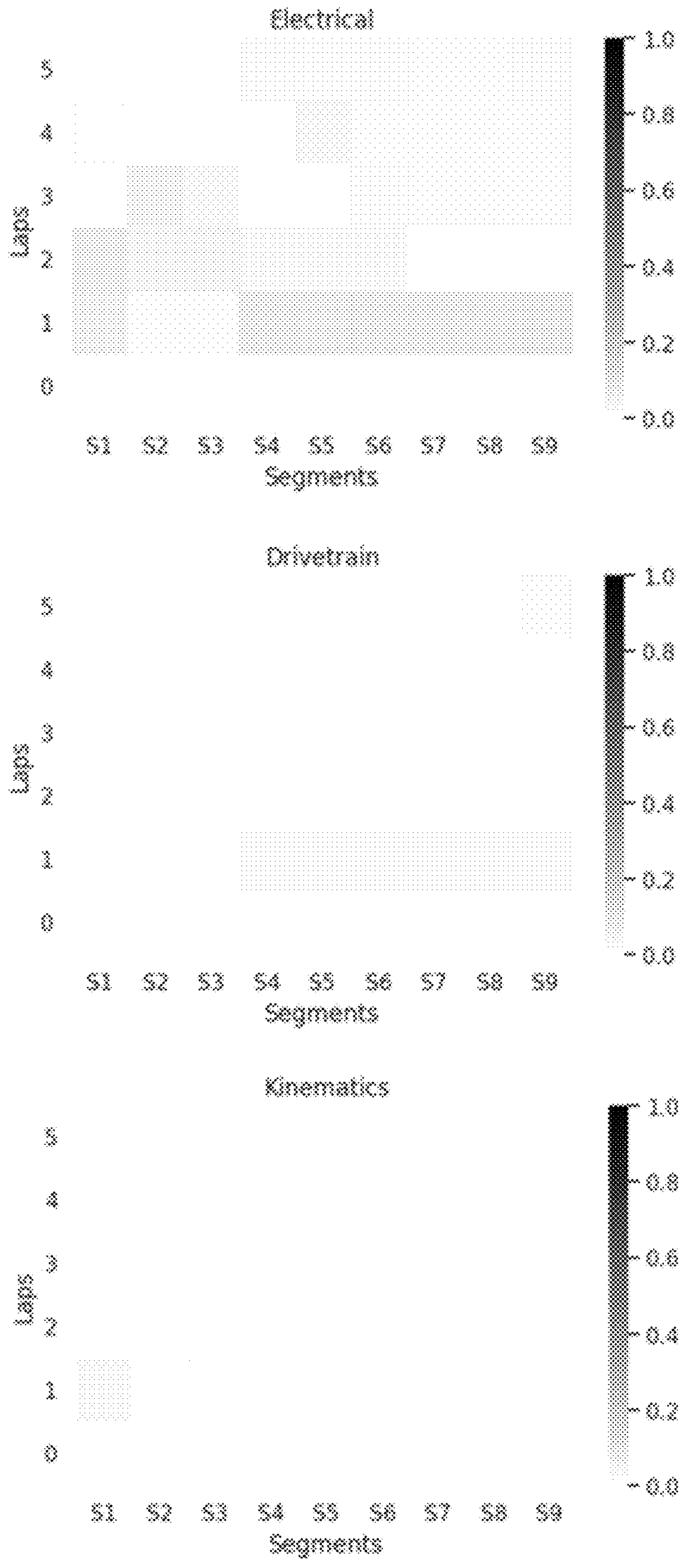
FIGS. 6A-6C are heatmap graphs showing results of cluster kinematics analysis of exemplary sensor data taken over time in three related “sessions,” according to further embodiments.
Figure 6B:
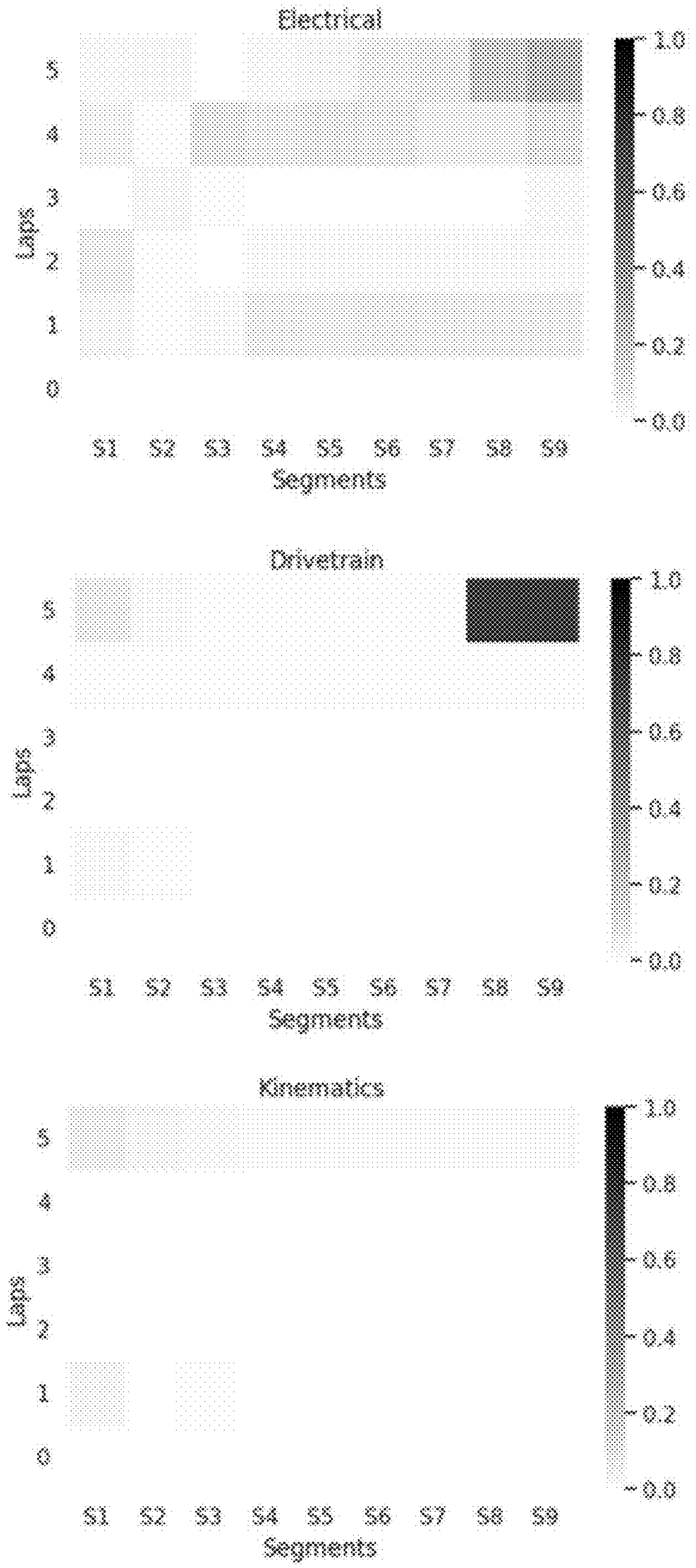
Figure 6C:
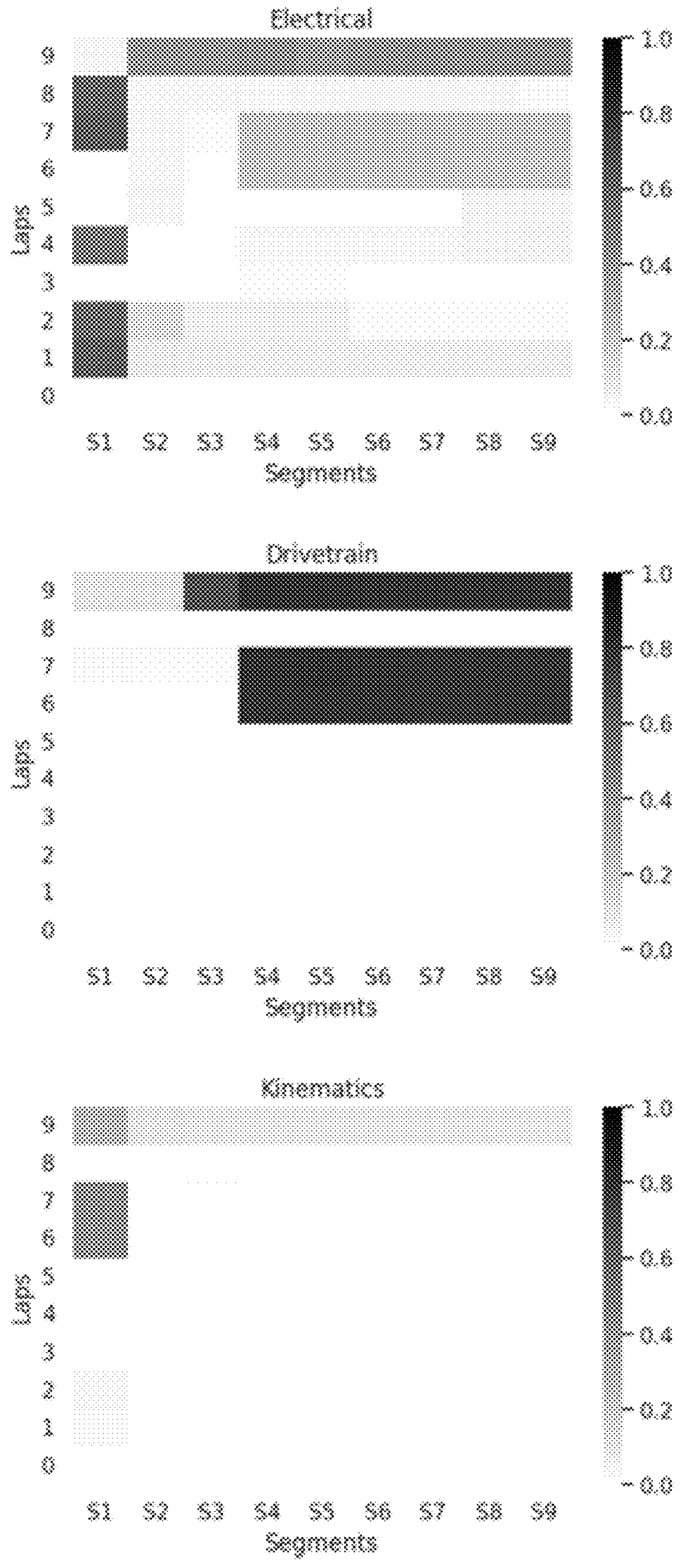

FIGS. 6A-6C show the results of such a cluster kinematics analysis of post-session data for two practice sessions and a qualifying session, respectively, from an IMSA GTD Pro racecar on an arbitrary track. The graphs have laps along the Y axis, increasing upwards, zero-based, and segments along the X axis, increasing left-right, one-based. The heatmap values represent the acceleration of the respective groups of channels for each segment, from lap to lap. Lap 0 from the first session (FIG. 6A) was used to initialize the cluster space's "nominal" cluster for the analysis. It will be appreciated that it can be clearly seen that the electrical system is showing anomalous behavior in the first session across multiple segments and laps, trending away from nominal operation of the racecar. In the second practice session (FIG. 6B), the anomalous behavior in the electrical system is more pronounced, and the electrical system's effects on the Drivetrain may be seen towards the end of the session (lap 5). Further, in the qualifying session (FIG. 6C), increased anomalous behavior in all systems may be seen, with the alternator catastrophically failing in lap 10, retiring the car (lap 10 not shown as it was not a complete lap).

Blockchain Analysis

In further embodiments, the cluster kinematics analysis described herein could be utilized to identify bad actors using automated systems to, e.g., register domains anonymously on the Handshake root naming system ("HNS"). Handshake is a blockchain-based domain name service ("DNS") that allows 100% anonymity in registering and controlling domains, whereas the traditional domain registration process is very strongly know-your-customer ("KYC"). As a result, bad actors are increasingly leveraging HNS to provide hidden DNS services for malicious activities that may be very difficult or impossible to trace back to the individuals or organizations. However, unlike normal KYC-based registrars where a domain can go live instantly, HNS has a 7-10 day delay between initial domain name proposal and going live. In theory, if the trending transaction activity on the blockchain for a newly-proposed domain name could be identified and classified based on known malicious domain names, the potential maliciousness of the new domain may be predicted before it even goes live, instead of the current approach which is to monitor the new domain for malicious activity (at which point it's too late).

In Handshake, domain names are registered via an open, anonymous, trustless auction system using a form of smart contract called a "covenant." This provides an origin transaction for all new domains in the blockchain, along with a temporal string of transactions throughout the auction process, as well as auction close, claim and eventual assignment to an IP address on the public internet. As the auction progresses on each subsequent block in the chain, a growing graph network around the proposed name node can be constructed that includes bids, wallets, ancestor transactions, and scale of activity at each timestep.

Similar to the predictive maintenance use case, a kinematics analysis system 300 as described herein may begin with producing a temporal series of feature space graph embeddings from the accretive graph representing a new domain being proposed on HNS and the transactions surrounding it. The graph can be encoded into feature vectors using approaches such as graph representation learning ("GRL") or knowledge graph embeddings ("KGE"). A same encoding function/model can be applied to the historical graphs from known malicious domain names, giving potentially three clusters in the feature space:

- Malicious—bad actors and attacks have been documented
- Benign—appears to be legitimate, no records of malicious activity
- Unknown—domain has never gone live, we don't know what its intended use is By calculating the distances in the cluster feature space for each update to the proposed domain name property graph as it relates to the center of the "Malicious," "Benign," and "Unknown" clusters, and taking the time derivatives for velocity and acceleration, the "path" that a new proposed domain name is "heading down" can be determined along with how quickly it is heading down that path. This could allow cybersecurity teams to flag potentially "Malicious" domains before they go live, or put domains trending towards "Unknown" them on a watchlist. The value to this approach is that activity surrounding the creation of new domain names can be "fingerprinted" without actually having a known identity attached to them, which in turn could help in de-anonymizing them once malicious activity of one domain with the same fingerprint has been attributed.

Reinforcement Learning Reward Systems

Existing reinforcement learning ("RL") approaches leverage a "reward" system wherein the RL model is trained to optimize for better rewards (e.g. score, profit, minimal energy expenditure, etc.). These rewards are often engineered to try and capture the RL model goal or workflow to guide the model in its search for optimal play. For example, rewarding a system only for retrieving an object from a table top often results in the agent knocking the table over so it can easily pick the object up off the floor, requiring reward engineering to guide the agent towards desired behaviors. By clustering desired system states, the cluster kinematics analysis described herein may be leveraged to better guide RL training approaches to "move" towards desired states without having to manually engineer reward systems, and could improve the performance of searching the RL hypothesis space.

In one example, an RL system may be enhanced with cluster kinematics analysis to optimize tuning of a racecar chassis. Tuning of a racecar chassis may occur in three dimensions:

- Mechanical balance (e.g., suspension tuning, wheels/tires)
- Aerodynamic balance (e.g., wings, downforce, drag reduction)
- Weight balance (e.g., center of gravity)

The process by which a race engineer tunes a chassis is to balance one aspect optimally, move to the next, and continue iterating over each dimension until the chassis is considered optimal. Often compromises have to be made for, e.g., better performance in straightaways on one circuit but left turns on another. Even then, the chassis might be optimally configured for a given environment, but undriveable, so then driver-in-the-loop (DIL) comes into play to ensure the resulting setup is the most drivable solution. This process takes time and manpower to accomplish, and minimizing driver time and test/refine iterations can make a significant difference for resource-constrained competitors. To this end, many teams leverage simulations to reduce the cost of track time and wear-and-tear on the racecar and driver.

Conventional reinforcement learning (RL) models are trained using known "terminal states" where the agent knows it has completed an "episode" where and end result can be recorded, often in the form of a score. For example, video games played by RL agents may use accumulation of scores and preservation of “lives” as a reward mechanism. There are some RL environments, such as autonomous vehicles, where there is no terminal state, but there is a very specific immediate goal to achieve, e.g., stay within X % of a designated vector while in motion, and the agent learns what needs to be done to maintain that state. In the case of chassis setup, there is no “terminal” state as the ideal performance of a vehicle on any given track at any given time is highly variable. There are theoretical limits that can be used as targets, but current RL approaches do not provide a mechanism to “reward” a system for optimizing across multiple goals with compromises, which is what is required for chassis setup.

Figure 4:
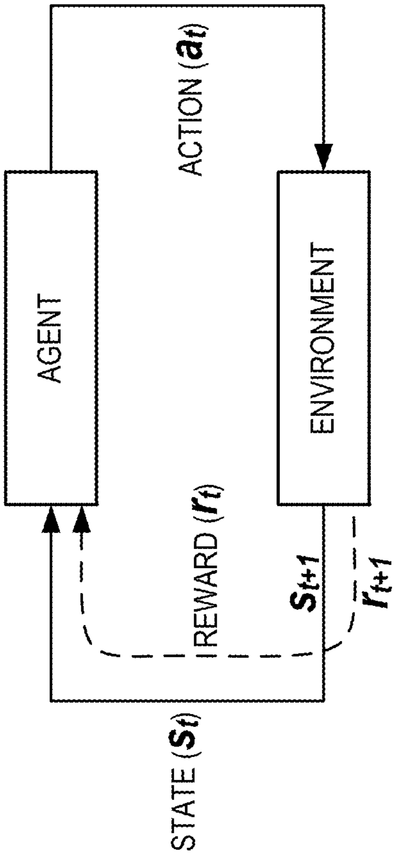
FIG. 4 is a state diagram showing details of a reinforcement learning use case for cluster kinematics, according to further embodiments.

Utilizing the technologies described herein, an RL model can be enhanced with cluster kinematics to allow for optimized tuning of a racecar chassis. Generally, in reinforcement learning, the fundamental loop involves an Agent interacting with an Environment through a series of Actions, States, and Rewards:, as shown in FIG. 4. Here, the setup of the chassis would be considered the “Action” as it is what would need to be changed by the agent during training. Ideally the agent would be capable of changing one or more of these tuning parameters per step. This could include, but not be limited to:

suspension tuning (rebound, damp, antiroll bars, dampers, etc.),
wheel settings (camber, castor),
aerodynamics (adjustment of front/rear wings),
transmission gearing (gearbox, diff)
programmable ECU parameters
brake settings (pressure, bias, etc.)

The completed simulation lap metrics (e.g., per-sector times, G-G-V values, etc.) would represent the “States” of the system. The track layout and weather conditions would serve as the “Environment” for the simulation and agent. The “Rewards” would need to be structured to inform the agent how effective it is being and ultimately produce an RL model that guides the agent to the desired behaviors (Actions). Rewards by their nature need to be single scalar values. Instead of a “score” or “reward” for reaching a terminal state in episodic environments, or minimizing some error provided for non-episodic environments, the agent here needs to be directed to a compromise between multiple theoretical targets in the shortest number of steps (i.e., simulated laps and S-A-R experiences). The state resulting from the most recent set of actions can be projected into the chassis setup feature space using an embedding function/model, calculating the distance between the new state and previous state, as well as the theoretical target states (cluster centers) in the same space. The time derivative of these distances can then be computed over time (previous steps) to calculate the velocity and acceleration of the agent’s progress towards the target states. These values may then be used to calculate a reward that informs the agent as to the effectiveness of the last action taken, which it will then use to learn an optimal path. The RL agent will be considered fully trained when it is unable to improve the state returned by further updates, or is unable to provide any meaningful updates to its Actions given some threshold or lack of further options (e.g., it has exhausted every combination of settings).

Exemplary Computer Architecture

Figure 5:
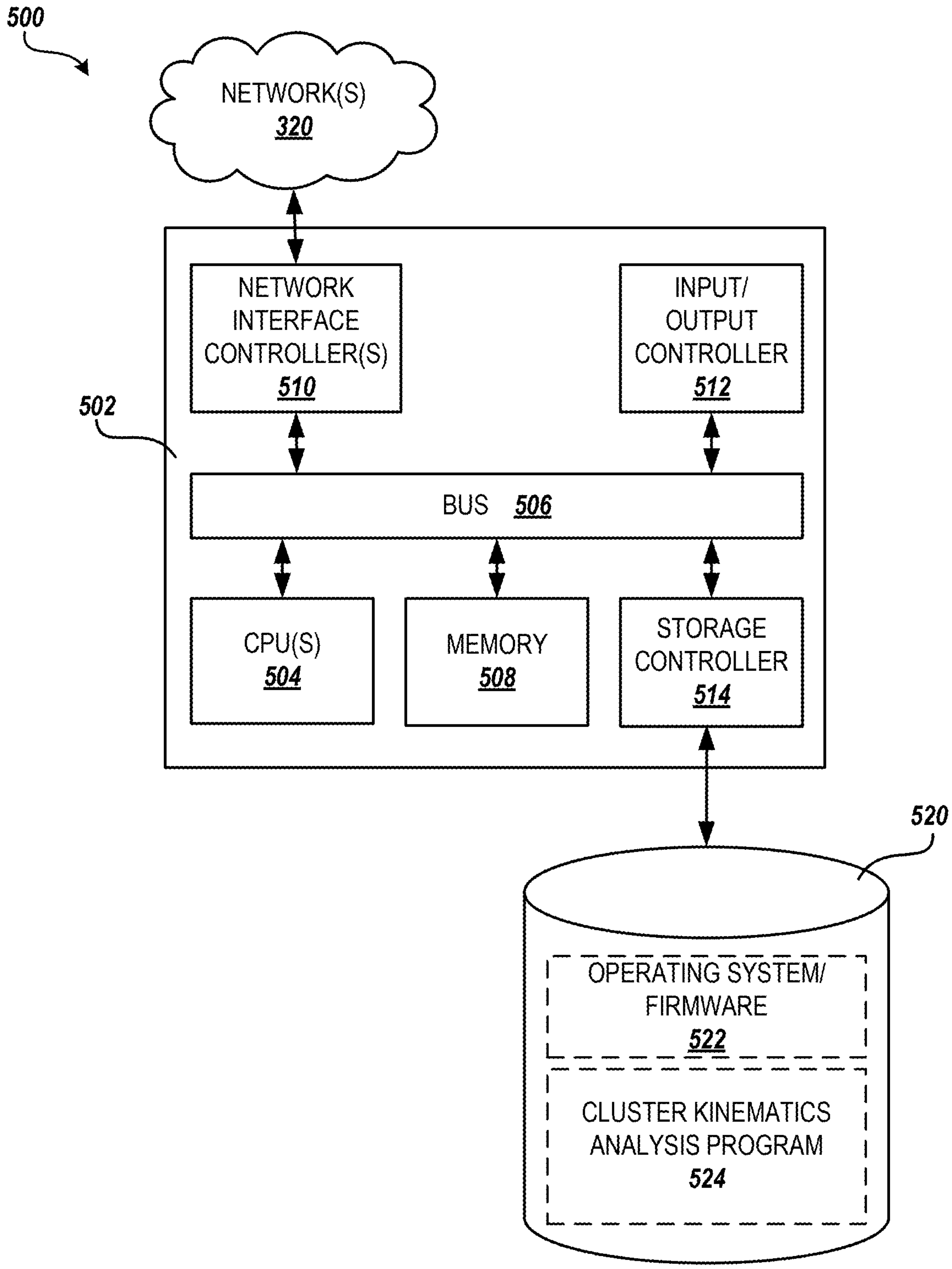
FIG. 5 is a block diagram showing an exemplary computing and software architecture for computing devices described herein.

FIG. 5 shows an example computer architecture 500 for a computer 502 capable of executing software components described herein for using cluster kinematics for enhanced data analysis of temporal data. The computer architecture 500 shown in FIG. 5 illustrates a conventional server computer, workstation, desktop computer, laptop, or other computing device, and may be utilized to execute any aspects of the software components presented herein described as executing on the cluster kinematics analysis server 310, a remote computer 330, or other computing platform. The computer 502 may include a baseboard, or “motherboard,” which is a printed circuit board to which a multitude of components or devices may be connected by way of a system bus or other electrical communication paths. In one illustrative embodiment, one or more central processing units (“CPUs”) 504 operate in conjunction with a bus 506. The CPUs 504 are standard programmable processors that perform arithmetic and logical operations necessary for the operation of the computer 502.

The CPUs 504 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The bus 506 provides an interface between the CPUs 504 and the remainder of the components and devices on the baseboard. The bus 506 may provide an interface to a memory 508. The memory 508 may include a random access memory (“RAM”) used as the main memory in the computer 502. The memory 508 may further include a computer-readable storage medium such as a read-only memory (“ROM”) or non-volatile RAM (“NVRAM”) for storing basic routines that that help to start up the computer 502 and to transfer information between the various components and devices. The ROM or NVRAM may also store other software components necessary for the operation of the computer 502 in accordance with the embodiments described herein.

According to various embodiments, the computer 502 may operate in a networked environment using logical connections to remote computing devices through one or more networks, such as the network(s) 320 described above or any other networking topology known in the art that connects the computer 502 to other, remote computers. The bus 506 may include functionality for providing network connectivity through one or more network interface controllers (“NICs”) 510, such as a gigabit Ethernet adapter. It should be appreciated that any number of NICs 510 may be present in the computer 502, connecting the computer to other types of networks and remote computer systems beyond those described herein.

The computer 502 may be connected to a mass storage device 520 that provides non-volatile storage for the computer. The mass storage device 520 may store system programs, application programs, other program modules, and data, which are described in greater detail herein. The mass storage device 520 may be connected to the computer 502 through a storage controller 514 connected to the bus 506. The mass storage device 520 may consist of one or more physical storage units. The storage controller 514 may interface with the physical storage units through a serial attached SCSI (“SAS”) interface, a serial advanced technology attachment ("SATA") interface, a fiber channel ("FC") interface, or other standard interface for physically connecting and transferring data between computers and physical storage devices.

The computer 502 may store data on the mass storage device 520 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 520 is characterized as primary or secondary storage, or the like. For example, the computer 502 may store information to the mass storage device 520 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 may further read information from the mass storage device 520 by detecting the physical states or characteristics of one or more particular locations within the physical storage units.

The mass storage device 520 may store an operating system 522 utilized to control the operation of the computer 502. According to some embodiments, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX or SOLARIS operating systems. It should be appreciated that other operating systems may also be utilized. The mass storage device 520 may store other system or application program modules and data utilized by the computer 502, such as a cluster kinematics analysis program 524 implementing functionality and user interfaces described herein for using cluster kinematics for enhanced data analysis of temporal data.

In some embodiments, the mass storage device 520 may be encoded with computer-executable instructions that, when loaded into the computer 502, may transform the computer from a general-purpose computing system into a special-purpose computer capable of implementing the embodiments described herein. These computer-executable instructions transform the computer 502 by specifying how the CPUs 504 transition between states, as described above. According to some embodiments, the mass storage device 520 may store computer-executable instructions that, when executed by the computer 502, perform the routine 200 described herein for performing data analysis of a temporal sequence of data samples utilizing cluster kinematics. In further embodiments, the computer 502 may have access to other computer-readable storage medium in addition to or as an alternative to the mass storage device 520.

The computer 502 may also include an input/output controller 512 for receiving and processing input from a number of input devices, such as a keyboard, a mouse, a touchpad, a touch screen, an electronic stylus, or other type of input device. Similarly, the input/output controller 512 may provide output to a display device, such as a computer monitor, a flat-panel display, a digital projector, a printer, a plotter, or other type of output device. It will be appreciated that the computer 502 may not include all of the components shown in FIG. 5, may include other components that are not explicitly shown in FIG. 5, or may utilize an architecture completely different than that shown in FIG. 5. For example, the processor(s) 504, memory 508, mass storage devices 520, and NIC(s) 510 of the computer architecture 500 may represent components of a System-on-a-Chip ("SoC") integrated circuit utilized in a mobile device or smartphone, virtualized resources from any number of server computers or computing devices, or generic processing resources, storage resources, and communication resources of a cloud-based computing system, with the bus 506 representing communication interlinks between the processing, storage, communication, and other computing resources in the cloud-based computing system. It is intended that all such computing architectures be included within the scope of this application.

CONCLUSION

Based on the foregoing, it will be appreciated that technologies for using cluster kinematics for enhanced data analysis of temporal data are described herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

The logical steps, functions or operations described herein as part of a routine, method or process may be implemented (1) as a sequence of processor-implemented acts, software modules or portions of code running on a microcontroller, computing device, or other computer system and/or (2) as interconnected machine logic circuits or circuit modules within the microcontroller, computing device, or other computer system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:

1. A method for monitoring an operational state of an object device using a cluster kinematics analysis system in communication with one or more sensors configured to monitor the object device, the method comprising the steps of:

receiving, at the cluster kinematics analysis system, a temporal sequence of data samples derived from sensor readings from the one or more sensors and associated with a node corresponding to the object device, each data sample in the temporal sequence comprising a vector of N dimensions, the temporal sequence of data samples comprising at least a first data sample corresponding to a first time and a second data sample corresponding to a second time;

projecting, by the cluster kinematics analysis system, the first data sample into a projection space of a previously trained clustering model, the clustering model defining a plurality of clusters at respective cluster centers in the N dimensions and trained on data samples comprising vectors of the same N dimensions, each of the plurality of clusters representing a respective operational state of the object device;

for each cluster of the plurality of clusters, calculating, by the cluster kinematics analysis system, a first distance value between the first data sample and the respective cluster center in the projection space;

projecting, by the cluster kinematics analysis system, the second data sample into the projection space of the clustering model;

for each cluster of the plurality of clusters, calculating, by the cluster kinematics analysis system, a second distance value between the second data sample and the respective cluster center in the projection space;

for at least one cluster of the plurality of clusters, calculating by the cluster kinematics analysis system, a per-cluster velocity of the node in the projection space relative to the at least one cluster from the first and second distance values and a difference between the first time and the second time, the per-cluster velocity representing a rate at which the node is converging toward or diverging from the respective cluster center of the at least one cluster in the projection space; and outputting, by the cluster kinematics analysis system, an indication of the operational state of the object device based at least in part on the per-cluster velocity calculated for the at least one cluster, wherein the indication of the operational state is determined from the per-cluster velocity characterizing motion of the node through the projection space prior to and independent of conventional cluster assignment of the node to any of the plurality of clusters.

2. The method of claim 1, wherein the temporal sequence of data samples further comprises a third data sample corresponding to a third time, and the method further comprises steps of:

projecting, by the cluster kinematics analysis system, the third data sample into the projection space of the clustering model;

for each cluster of the plurality of clusters, calculating, by the cluster kinematics analysis system, a third distance value between the third data sample and the respective cluster center in the projection space;

for the at least one cluster, calculating by the cluster kinematics analysis system, a per-cluster second velocity of the node in the projection space relative to the at least one cluster from the second and third distance values and a difference between the second time and the third time; and for the at least one cluster, calculating by the cluster kinematics analysis system, a per-cluster acceleration of the node in the projection space relative to the at least one cluster from the per-cluster first velocity and the per-cluster second velocity and the difference between the second time and the third time, the per-cluster acceleration indicating a rate of change of the node's convergence toward or divergence from the respective cluster center of the at least one cluster.

3. The method of claim 2, further comprising steps of:

receiving, by the cluster kinematics analysis system, further data samples associated with the node, each of the further data samples corresponding with a subsequent time value; and upon receiving each of the further data samples, calculating new per-cluster velocity and per-cluster acceleration of the node in the projection space relative to the at least one cluster based at least in part on each subsequent time value.

4. The method of claim 2, wherein the per-cluster kinematic metrics computed for the node are utilized by the cluster kinematics analysis system to project a trajectory of the node through the projection space and predict a future cluster assignment of the node within the clustering model based on the projected trajectory, the projected trajectory determined from the per-cluster kinematic metrics calculated for the node prior to and independent of conventional cluster assignment of the node to any of the plurality of clusters.

5. The method of claim 4, wherein the one or more sensors comprise at least one of a pressure sensor, a temperature sensor, a current consumption sensor, a voltage sensor, and a position sensor.

6. The method of claim 4, wherein the data samples associated with the node are received by the cluster kinematics analysis system in real-time over a network connecting the object device to the cluster kinematics analysis system, and the future cluster assignment prediction for the node is updated upon receipt of each of the data samples to provide substantially real-time anomaly detection and failure prediction for the object device, and wherein, when the projected trajectory of the node is determined to be converging toward a target cluster of the plurality of clusters representing a failure mode of the object device, the cluster kinematics analysis system estimates a remaining useful life of the object device based at least in part on the per-cluster velocity and the per-cluster acceleration calculated for the target cluster.

7. The method of claim 4, further comprising:

identifying, by the cluster kinematics analysis system, a target cluster of the plurality of clusters toward which the node is converging based on the projected trajectory and the per-cluster kinematic metrics, the target cluster representing a failure mode of the object device; and estimating, by the cluster kinematics analysis system, a remaining useful life of the object device based at least in part on the per-cluster velocity and a per-cluster acceleration calculated for the target cluster, the remaining useful life representing a predicted time interval until the node reaches the target cluster in the projection space.

8. The method of claim 1, wherein the distance values between each data sample and the respective cluster centers of the plurality of clusters calculated by the cluster kinematics analysis system upon receipt of each data sample associated with the node are stored in a datastore connected to the cluster kinematics analysis system for retrieval and computation of new per-cluster kinematic metrics for the node upon receipt of subsequent data samples associated with the node.

9. A non-transitory computer-readable medium containing processor-executable instructions that, when executed by a processor of a cluster kinematics analysis system in communication with one or more sensors configured to monitor an object device, cause the cluster kinematics analysis system to:

receive a first data sample of a temporal sequence of data samples derived from sensor readings from the one or more sensors and associated with a node corresponding to the object device, the first data sample corresponding to a first time;

project the first data sample into a projection space of a previously trained clustering model, the clustering model defining a plurality of clusters at respective cluster centers, each of the plurality of clusters representing a respective operational state of the object device;

for each cluster of the plurality of clusters, calculate a first distance value between the first data sample and the respective cluster center in the projection space;

receive a second data sample, derived from sensor readings from the one or more sensors, corresponding to a second time and project the second data sample into the projection space;

for each cluster of the plurality of clusters, calculate a second distance value between the second data sample and the respective cluster center in the projection space;

for at least one cluster of the plurality of clusters, calculate a per-cluster first velocity of the node in the projection space relative to the at least one cluster from the first and second distance values and a difference between the first time and the second time;

receive a third data sample, derived from sensor readings from the one or more sensors, corresponding to a third time and project the third data sample into the projection space;

for each cluster of the plurality of clusters, calculate a third distance value between the third data sample and the respective cluster center in the projection space;

for the at least one cluster, calculate a per-cluster second velocity of the node in the projection space relative to the at least one cluster from the second and third distance values and a difference between the second time and the third time;

for the at least one cluster, calculate ana per-cluster acceleration of the node in the projection space relative to the at least one cluster from the per-cluster first velocity and the per-cluster second velocity and the difference between the second time and the third time, the per-cluster acceleration indicating a rate of change of the node's convergence toward or divergence from the respective cluster center of the at least one cluster; and-predict, based at least in part on the per-cluster first velocity, the per-cluster second velocity, and the per-cluster acceleration, a future cluster assignment of the node within the clustering model, the future cluster assignment indicative of an evolving operational state of the object device, wherein the predicted future cluster assignment is determined from the per-cluster kinematic metrics characterizing motion of the node through the projection space prior to and independent of conventional cluster assignment of the node to any of the plurality of clusters.

10. The non-transitory computer-readable medium of claim 9, containing further processor-executable instructions that cause the cluster kinematics analysis system to, upon receiving further data samples in the temporal sequence associated with the node, each of the further data samples corresponding with a subsequent time value, calculate new per-cluster velocity and per-cluster acceleration of the node in the projection space relative to the at least one cluster based on each subsequent time value.

11. The non-transitory computer-readable medium of claim 9, wherein the per-cluster velocity and per-cluster acceleration calculated for the node are utilized by the cluster kinematics analysis system to project a trajectory of the node through the projection space and predict the future cluster assignment within the clustering model for the node.

12. The non-transitory computer-readable medium of claim 11, wherein the cluster kinematics analysis system identifies, based on the projected trajectory, a target cluster of the plurality of clusters toward which the node is converging, and wherein the target cluster represents a new operational state of the object device.

13. The non-transitory computer-readable medium of claim 11, wherein the data samples associated with the node are received by the cluster kinematics analysis system in real-time over a network connecting the object device to the cluster kinematics analysis system, and the future cluster assignment prediction for the node areis updated upon receipt of each of the data samples to provide one or more of substantially real-time anomaly detection and failure prediction for the object device.

14. The non-transitory computer-readable medium of claim 11, containing further processor-executable instructions that cause the cluster kinematics analysis system to:

identify, based on the projected trajectory and the per-cluster acceleration, a target cluster of the plurality of clusters toward which the node is converging, the target cluster representing a failure mode of the object device; and estimate a remaining useful life of the object device based at least in part on the per-cluster first velocity, the per-cluster second velocity, and the per-cluster acceleration calculated for the target cluster, the remaining useful life representing a predicted time interval until the node reaches the target cluster in the projection space.

15. A cluster kinematics analysis system for monitoring an operational state of an object device comprising:

a communication interface configured to receive, from one or more sensors configured to monitor the object device, a temporal sequence of data samples associated with a node corresponding to the object device, each data sample associated with a respective time value;

a datastore containing a previously trained clustering model defining a plurality of clusters at respective cluster centers in an N-dimensional projection space, each of the plurality of clusters representing a respective operational state of the object device; and a processor operably connected to the communication interface and the datastore and configured to, upon receiving a data sample of the temporal sequence to:

apply feature encoding to the data sample to encode the sample into a vector of N dimensions and project the data sample into the projection space;

for each cluster of the plurality of clusters, calculate a distance value between the data sample and the respective cluster center in the projection space, store the calculated distance values in the datastore associated with the node and the associated time value; and for at least one cluster of the plurality of clusters, calculate one or more per-cluster kinematic metrics from the calculated distance values, the associated time value, and previously calculated distance values and per-cluster kinematic metrics for the node retrieved from the datastore, the one or more per-cluster kinematic metrics representing a trajectory of the node through the projection space in relation to the respective cluster center of the at least one cluster, the trajectory indicative of the operational state of the object device and determined prior to and independent of conventional cluster assignment of the node to any of the plurality of clusters.

16. The cluster kinematics analysis system of claim 15, wherein the one or more per-cluster kinematic metrics calculated for the node comprise a per-cluster velocity of the node in the projection space relative to the at least one cluster calculated from the distance value between the data sample and the respective cluster center calculated for the data sample, the time value associated with the data sample, a distance value between a previous data sample and the respective cluster center calculated for the previous data sample, and the time value associated with the previous data sample, the distance value calculated for the previous data sample and the time value associated with the previous data sample retrieved from the datastore.

17. The cluster kinematics analysis system of claim 16, wherein the one or more per-cluster kinematic metrics calculated for the node further comprise a per-cluster acceleration of the node in the projection space relative to the at least one cluster calculated from the per-cluster velocity calculated for the data sample, the time value associated with the data sample, a per-cluster velocity calculated for a previous data sample, and the time value associated with the previous data sample, the velocity calculated for the previous data sample and the time value associated with the previous data sample retrieved from the datastore.

18. The cluster kinematics analysis system of claim 15, further comprising a network operably connecting the processor to the object device, wherein the data samples in the temporal sequence associated with the node are received by the cluster kinematics analysis system in real-time over the network, and wherein the processor is further configured to update the per-cluster kinematic metrics upon receipt of each of the data samples to provide substantially real-time anomaly detection and failure prediction for the object device, and to estimate, when the trajectory of the node is determined to be converging toward a target cluster of the plurality of clusters representing a failure mode of the object device, a remaining useful life of the object device based at least in part on the per-cluster velocity and the per-cluster acceleration calculated for the target cluster.

19. The cluster kinematics analysis system of claim 18, wherein the one or more per-cluster kinematic metrics calculated for the node comprise a per-cluster velocity and a per-cluster acceleration of the node in the projection space relative to a target cluster of the plurality of clusters, the target cluster representing a failure mode of the object device, and wherein the processor is further configured to:

identify the target cluster from among the plurality of clusters based on the trajectory of the node through the projection space; and calculate a remaining useful life of the object device based at least in part on the per-cluster velocity and the per-cluster acceleration calculated for the target cluster, the remaining useful life representing a predicted time interval until the node reaches the target cluster in the projection space.

20. The cluster kinematics analysis system of claim 15, wherein calculating the distance value associated with each of the one or more clusters in the clustering model for the data sample comprises calculating a Euclidean distance between the N-dimensional vector comprising the data sample projected into the projection space and an N-dimensional center defined for each of the one or more clusters in the projection space by the clustering model.

* * * * *